United States Patent
Czerwiec et al.

(10) Patent No.: US 7,639,697 B2
(45) Date of Patent: Dec. 29, 2009

(54) FACILITATING DIGITAL SUBSCRIBER LINE SERVICES VIA A SUBSCRIBER PREMISE NETWORK INTERFACE DEVICE

(75) Inventors: Richard M. Czerwiec, Raleigh, NC (US); Richard H. Bailey, Raleigh, NC (US); Richard R. Rzonca, Raleigh, NC (US); Gus C. Sanders, Jr., Raleigh, NC (US); Randall B. Sharpe, Chapel Hill, NC (US); Joseph E. Sutherland, Raleigh, NC (US)

(73) Assignee: Alcatel Lucent, Paris (FR)

( * ) Notice: Subject to any disclaimer, the term of this patent is extended or adjusted under 35 U.S.C. 154(b) by 698 days.

(21) Appl. No.: 11/354,525

(22) Filed: Feb. 15, 2006

(65) Prior Publication Data

US 2006/0153241 A1    Jul. 13, 2006

Related U.S. Application Data

(62) Division of application No. 10/132,806, filed on Apr. 25, 2002, now Pat. No. 7,274,669.

(51) Int. Cl.
*H04L 12/28* (2006.01)

(52) U.S. Cl. .............................. 370/395.64; 370/395.52; 370/465; 370/352; 370/395.65

(58) Field of Classification Search ........................ None
See application file for complete search history.

(56) References Cited

U.S. PATENT DOCUMENTS

| | | | |
|---|---|---|---|
| 6,181,775 B1 | 1/2001 | Bella | |
| 6,714,534 B1 * | 3/2004 | Gerszberg et al. | 370/352 |
| 6,731,678 B1 * | 5/2004 | White et al. | 375/219 |
| 2002/0101851 A1 * | 8/2002 | Blake et al. | 370/352 |
| 2002/0146014 A1 * | 10/2002 | Karlsson et al. | 370/395.6 |
| 2004/0027992 A1 * | 2/2004 | Volkening et al. | 370/241 |
| 2004/0213204 A1 * | 10/2004 | Yang | 370/352 |

FOREIGN PATENT DOCUMENTS

| | | |
|---|---|---|
| EP | 1014670 A2 | 6/2000 |
| WO | 01/95598 A2 | 12/2001 |

* cited by examiner

*Primary Examiner*—Duc C Ho
(74) *Attorney, Agent, or Firm*—Galasso & Associates, LP (57) ABSTRACT

Various aspects of apparatuses and methods for enabling a subscriber premise network interface device (NID) to facilitate communication services including digitally derived voice services to be facilitated between a central office and a subscriber premise are disclosed herein. In accordance with one embodiment of the disclosures herein, such a method includes facilitating a downstream DSL voice channel transmission process at a subscriber premise Network Interface Device (NID) and facilitating an upstream DSL voice channel transmission process at the subscriber premise NID. The downstream DSL voice channel transmission process facilitates converting a voice component of a downstream DSL data stream to a corresponding downstream analog voice signal. The upstream DSL voice channel transmission process facilitates converting an upstream analog voice signal to an upstream voice component of an upstream DSL data stream.

16 Claims, 5 Drawing Sheets

FIG. 5

FACILITATING DIGITAL SUBSCRIBER LINE SERVICES VIA A SUBSCRIBER PREMISE NETWORK INTERFACE DEVICE

CROSS-REFERENCE TO RELATED APPLICATIONS

This application is a divisional of U.S. application Ser. No. 10/132,806 filed on Apr. 25, 2002 now U.S. Pat. No. 7,274,669 entitled "Facilitating Digital Subscriber Line Services via a Subscriber Premise Network Interface Device."

FIELD OF THE DISCLOSURE

The disclosures herein relate generally to Digital Subscriber Line (DSL) network interface devices and more particularly to facilitating communication services via a subscriber premise DSL network interface device.

BACKGROUND

Communication service subscribers often have a need for additional communication services. Accordingly, service providers have a desire to offer such additional communication services in a convenient and cost-effective manner. One or more additional telephone lines and one or more additional high-speed data ports are examples of such additional communication services.

However, the ability to offer communication service subscribers such additional communication services is often precluded due to necessary existing copper-pair telephone lines being unavailable. Conventional solutions for enabling such additional communication services to be implemented when additional existing copper-pair telephone lines are not available include adding one or more new copper-pair telephone lines, utilizing pair gain (e.g. via digital added main line), adding fiber optic service and the like. Adding one or more new copper-pair telephone lines and adding fiber optic service is costly and time-consuming. Pair gain via DAML only adds one additional Plain Old Telephone Service (POTS) line or a low speed data line. Furthermore, each of these conventional solutions typically requires a truck roll of one sort or another, thus requiring scheduling and increasing cost.

Accordingly, utilizing a digital subscriber line to facilitate enhanced subscriber communication services over a single copper-pair telephone line in a manner that overcomes limitations associated with conventional solutions is useful.

DETAILED DESCRIPTION OF THE FIGURES

Embodiments of the disclosures made herein relate to utilizing a subscriber premise Network Interface Device (NID) in a manner that expands communication services capable of being offered via a single paired-conductor transmission line (e.g. a copper pair telephone line). To this end, a subscriber premise NID in accordance with an embodiment of the disclosures made herein is compatible with a single data network that segregates traffic only at network end points or gateways. Furthermore, such a subscriber premise NID is preferably centrally provisionable via a location remote from the subscriber premise. Accordingly, such a subscriber premise NID at least partially overcomes limitations associated with offering communication services via a single paired-conductor transmission line.

A subscriber premise NID in accordance with an embodiment of the disclosures made herein contributes to overcoming limitations associated with offering communication services via conventional NIDs. For example, multiple communication services are capable of being offered via a single paired conductor transmission line, thus contributing to conservation of available paired-conductor transmission lines. Additional communication services may be provided to the subscriber as needed/when needed via remote provisioning, thus enhancing customer service and service provider financial position. Such NIDs are extendable to digital and/or packet based data transport protocols and architectures. Remote diagnostics are capable of being facilitated by such NIDs, further enhancing customer service and service provider financial position. Furthermore, additional POTS lines to a subscriber premise become a matter of provisioning, such as via Gateway (GW) management system, without a truck roll or wiring changes in the central office.

Furthermore, one distinguishing attribute of the subscriber premise NID disclosed herein is the placement of an 'intelligent' NID at the end of the network (at the end-user's premises) to serve as a remotely-controlled gate-keeper, enabling/disabling logical channels on the single twisted pair to the premises. In one embodiment, the subscriber premise NID is physically mounted on a subscriber's home, but it is considered operating company (e.g. service provider) equipment. Such placement allows the bandwidth of the existing line (now vastly increased by DSL technology), to be selectively provided to, or withheld from, the subscriber and, in fact, changed at will without a "truck roll".

Figure 1:
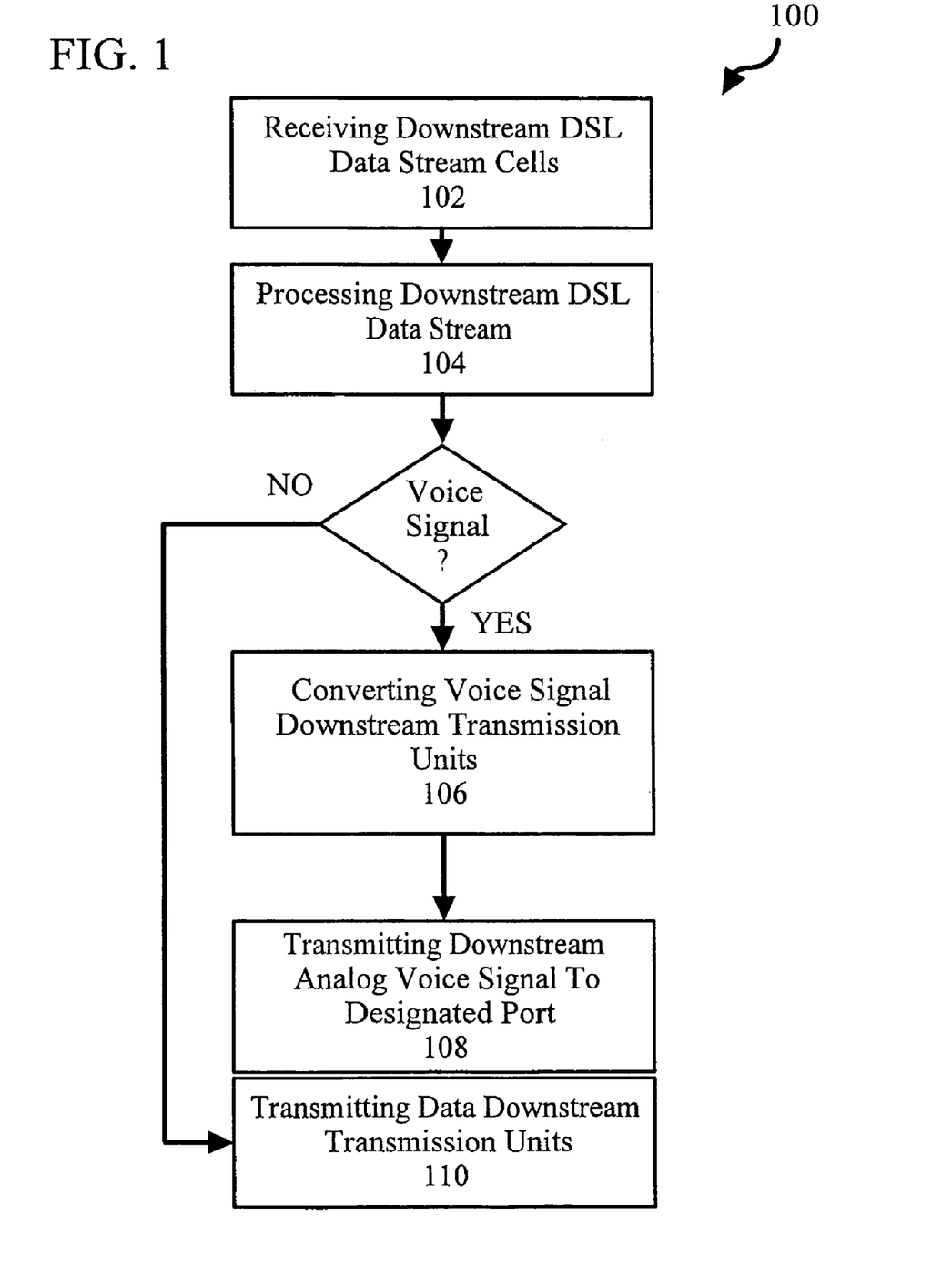
FIG. 1 is a flow chart view depicting a method for facilitating a downstream DSL transmission process at a subscriber premise Network Interface Device (NID) in accordance with an embodiment of the disclosures made herein.

A method 100 for facilitating a downstream DSL transmission process in accordance with an embodiment of the disclosures made herein is depicted in FIG. 1. Such a method is capable of being facilitated by a subscriber premise NID in accordance with an embodiment of the disclosures made herein. The method 100 includes an operation 102 for receiving a downstream DSL data stream. DSL data streams include a plurality of transmission units such as, for example, ATM cells and IP packets. Such a downstream DSL data stream is typically transmitted for reception by a subscriber premise communication system from a central office communication apparatus.

Typically, the downstream DSL data stream is an aggregate DSL data stream including a plurality of components (e.g. a voice component, a data component and/or a video component). A voice component of the downstream DSL data stream is comprised of voice signal downstream transmission units. A data component of the downstream DSL data stream is comprised of data downstream transmission units. A video component of the downstream data stream is comprised of video downstream transmission units. However, it is contemplated herein that the downstream DSL data stream as received by a particular subscriber premises NID may include only one type of communication component (i.e. a voice, data or video component).

After receiving the downstream DSL data stream, an operation 104 is performed for processing transmission units of the downstream DSL data stream (i.e. downstream transmission units). Processing the downstream transmission units includes determining the type of content carried within each one of the downstream transmission units. One embodiment of determining the type of content carried within each downstream transmission unit includes determining a protocol according to which each of the downstream transmission unit is transmitted and/or configured. For example, a downstream transmission unit transmitted according to ATM Application Layer 2 (AAL-2) protocol typically corresponds to voice signal content while a downstream transmission unit transmitted according to AAL-5 protocol typically corresponds to data content. Another embodiment of determining the type of content carried within each downstream transmission unit includes assessing a channel identifier (e.g. a virtual channel identifier) of each downstream transmission unit and correlating the channel identifier to a particular type of content (voice, data, video, etc).

It is contemplated herein that processing the downstream transmission units may also include reassembling contents carried in a plurality of the downstream transmission units. For example, when the downstream transmission units are ATM cells each having segments of a corresponding IP packet carried therein, the contents are reassembling to generate the corresponding IP packets. The reassembled IP packets (i.e. processed downstream transmission units) proceed within the method 100.

After processing the downstream transmission units, an operation 106 is performed for converting voice signal downstream transmission units to one or more corresponding downstream analog voice signals and an operation 108 is performed for transmitting each downstream analog voice signal for reception by a respective subscriber voice communication system (i.e. telephone, fax, etc.) via a designated subscriber interface port. An embodiment of converting the voice signal downstream transmission units to the corresponding downstream analog voice signal includes performing a transmission unit-to-analog conversion and determining a respective port identifier representing a designated subscriber interface port of the subscriber premise NID. It is contemplated herein that determining the respective port identifier may be performed as part of the operation 104 for processing the downstream DSL data stream.

Transmission unit-to-analog conversion is defined herein to include a conversion process for converting a transmission unit (e.g. an ATM cell, IP packet or other type of transmission unit containing digitized and encoded voice samples) to a corresponding one or more analog signals. In at least one embodiment, such a transmission unit-to-analog conversion includes operations such as protocol translation, decoding, and/or d/a conversion. Similarly, analog-to-transmission unit conversion is defined herein to include a conversion process for converting an analog signal to at least one transmission unit. In at least one embodiment, such an analog-to-transmission unit conversion includes operations such as for digitizing (a/d conversion), encoding, and/or packetizing (protocol generation).

An operation 110 is performed for transmitting the data downstream transmission units for reception by one or more respective subscriber data processing system via one or more corresponding designated subscriber interface ports. An embodiment of transmitting the data downstream transmission units includes transmitting data downstream transmission units from the subscriber premise NID toward a subscriber communication apparatus in a manner that is well suited for a transmission at the subscriber premise facility. Example protocols well suited for transmitting transmission units within the subscriber premise facility include Home Phone Networking Alliance Methodology, twisted pair Ethernet, wireless Ethernet, etc.

Figure 2:
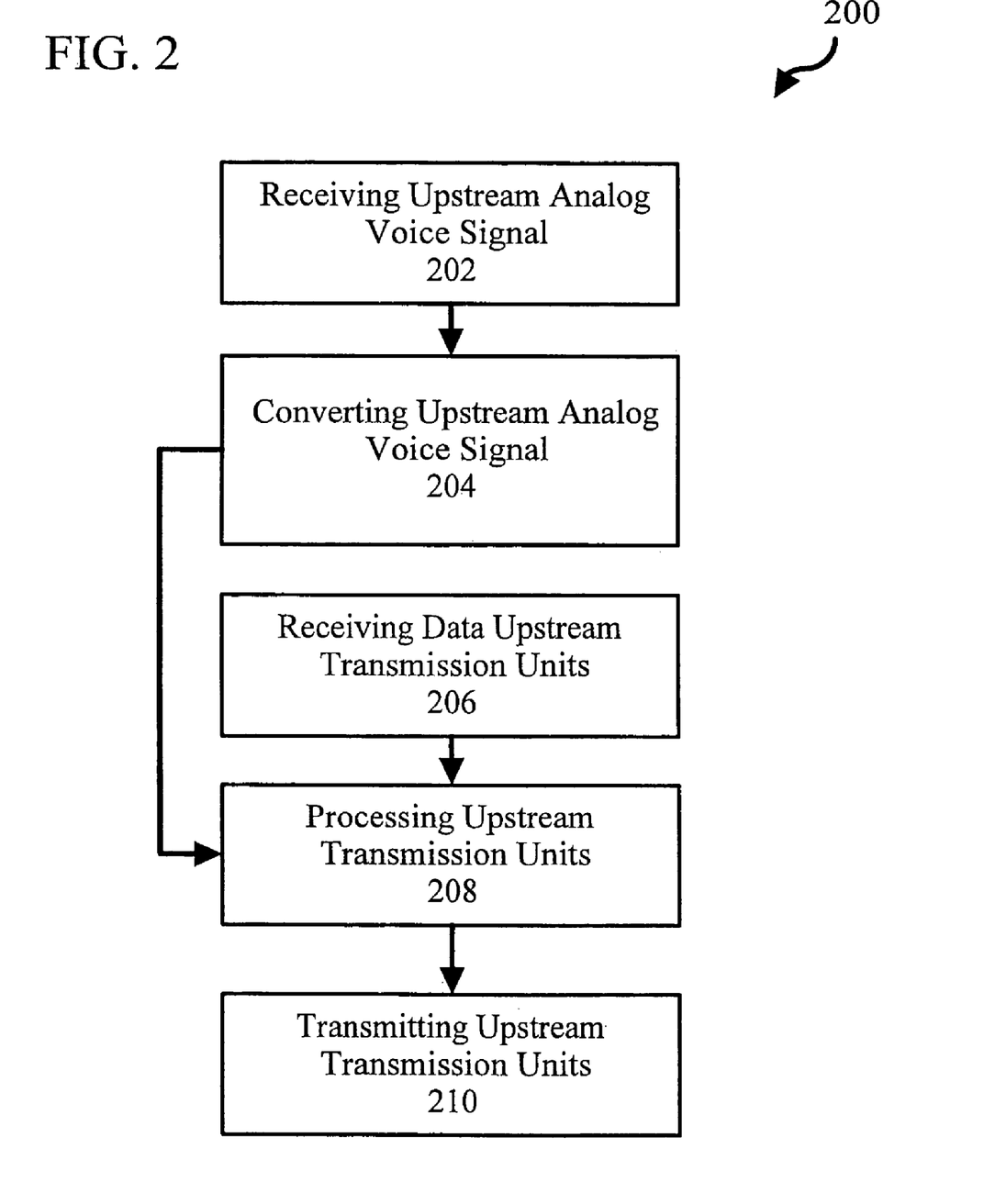
FIG. 2 is a flow chart view depicting a method for facilitating an upstream DSL transmission process at a subscriber premise NID in accordance with an embodiment of the disclosures made herein.

A method 200 for facilitating an upstream DSL transmission process in accordance with an embodiment of the disclosures made herein is depicted in FIG. 2. Such a method is capable of being facilitated by a subscriber premise NID in accordance with an embodiment of the disclosures made herein. The method 200 includes an operation 202 for receiving an upstream analog voice signal via a respective subscriber interface port, such as from a subscriber voice communication device. In practice, a plurality of upstream analog voice signal may be received at respective subscriber interface ports and processed according to the method 200.

One embodiment of receiving the upstream analog voice signal includes filtering an aggregate upstream signal for removing a first frequency component of the aggregate upstream signal. A frequency component corresponding to a data component of the aggregate upstream signal is an example of the first frequency component. Accordingly, such filtering removes a data component of the aggregate upstream signal from the voice path, leaving only a voice signal component (i.e. the upstream analog voice signal) of the aggregate upstream signal.

In response to receiving the upstream analog voice signal, an operation 204 is performed for converting the upstream analog voice signal to a plurality of corresponding voice signal upstream transmission units. In the case of multiple upstream analog signals, each one of the upstream analog signals is converted to corresponding voice signal upstream transmission units. Such plurality of voice signals upstream transmission units comprise a voice component of an upstream DSL data stream. An embodiment of converting an upstream analog voice signal to corresponding voice signal upstream transmission units includes performing an analog-to-transmission unit conversion and assigning a respective port identifier representing the corresponding subscriber interface port of the subscriber premise NID. In at least one embodiment, the upstream analog voice signal is converted to a plurality of Internet Protocol packets. Another embodiment is conversion to ATM cells.

In conjunction with receiving one or more analog upstream voice signals, an operation 206 is performed for receiving data upstream transmission units transmitted from one or more subscriber data processing systems towards a central office communication apparatus. A data component of the upstream DSL data stream comprises the data upstream transmission units. One embodiment of receiving the data upstream transmission units includes filtering an aggregate upstream signal for removing a second frequency component of the aggregate upstream signal from the data path. A frequency component corresponding to a voice component of the aggregate upstream signal is an example of the second frequency component. Accordingly, such filtering removes a voice component of the aggregate upstream signal leaving only a data component (i.e. the data upstream transmission units) in the data path.

After or in parallel with converting the upstream analog voice signal and/or receiving the data upstream transmission units, an operation 208 is performed for processing the data and voice signal upstream transmission units. One embodiment of processing the data and voice upstream transmission units includes segmenting contents of at least a portion of the voice signal and/or data and/or video upstream transmission units and includes assigning a channel identifier to each one of said segmented (processed) voice signal and/or data and/or video upstream transmission units. Segmenting the contents of an Internet Protocol packet into a plurality of ATM cells is an example of segmenting contents of at least a portion of the voice signal and/or data and/or video upstream transmission units. A virtual channel (VC) identifier is an example of the channel identifier assigned to each one of the voice signal and/or data and/or video upstream transmission units. After processing the voice signal and/or data and/or video upstream transmission units, an operation 210 is performed for transmitting these processed transmission units toward the central office communication apparatus. Within the scope of the disclosures made herein, data includes video with respect to facilitating processing and transmission of video signals.

The operations for receiving, processing and converting voice signal downstream transmission units represent a downstream DSL voice channel transmission process. Similarly, the operations for receiving the upstream analog voice signal, converting the upstream analog voice signal and processing the voice signal upstream transmission units represent an upstream DSL voice channel transmission process. An advantage of the downstream and upstream DSL voice channel transmission processes is that voice signals corresponding to a plurality of different subscriber interface ports (e.g. telephone numbers) may be communicated via the subscriber premise NID over a single copper pair telephone line. Accordingly, the capability of an existing copper pair may be extended in an effective yet cost efficient manner.

Figure 3:
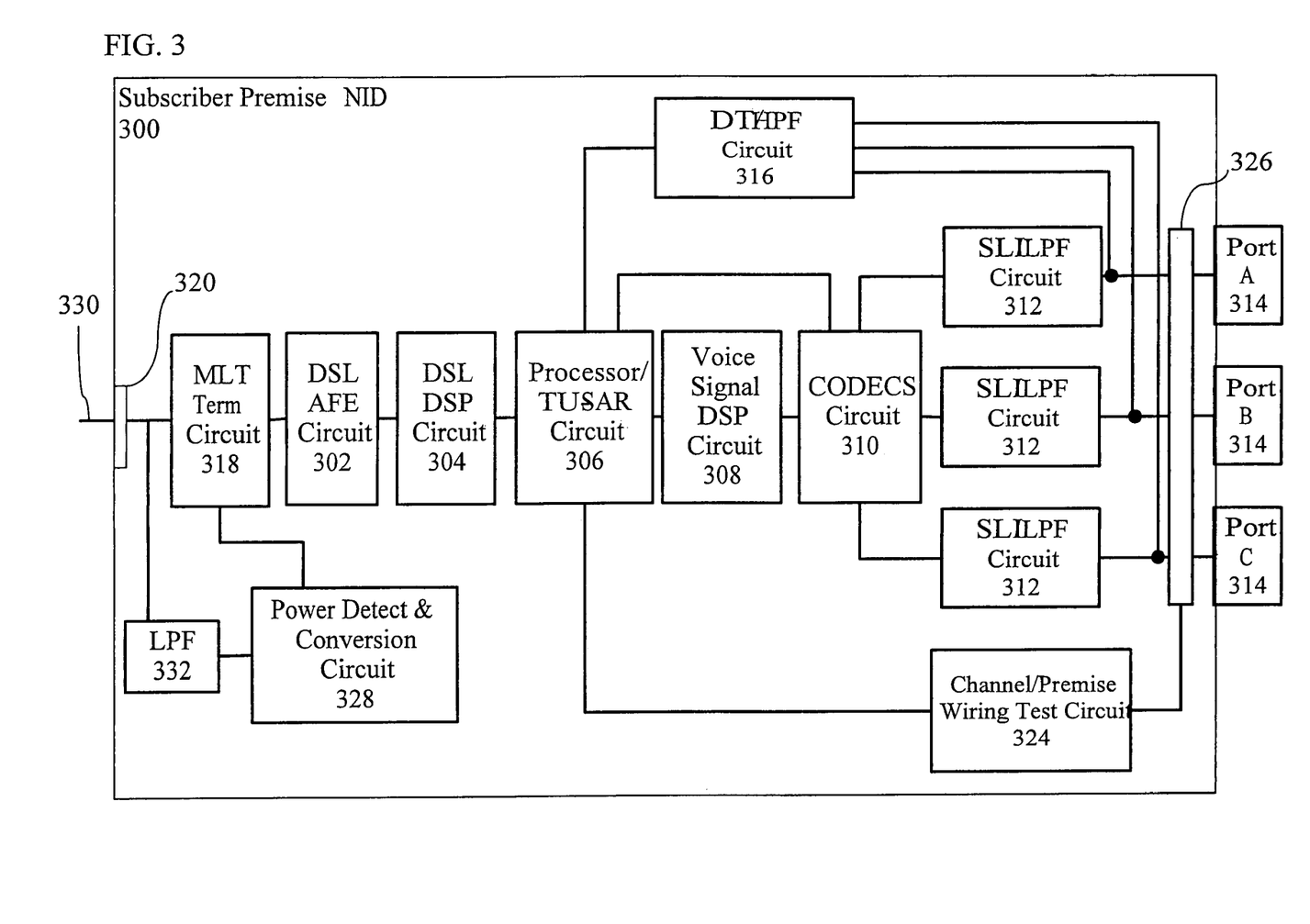
FIG. 3 is a block diagram depicting a subscriber premise NID in accordance with an embodiment of the disclosures made herein, wherein the subscriber premise NID is capable of facilitating methods disclosed herein.

A subscriber premise Network Interface Device (NID) 300 in accordance with an embodiment of the disclosures made herein is depicted in FIG. 3. It is contemplated herein that the various circuits of the subscriber premise NID may be discrete (not sharing circuit components) with respect to each other and/or integral (sharing at least some circuit components) with respect to each other. The subscriber premise NID 300 includes a Digital Subscriber Line (DSL) Analog Front End (AFE) circuit 302 and a DSL Digital Signal Processor (DSP) circuit 304 connected to the DSL AFE 302. The DSL AFE circuit 302 and the DSL DSP circuit 304 jointly facilitate an analog-to-digital process for converting DSL signals received by the subscriber premise NID 300 from a DSL specific analog format to a transmission unit specific digital format (e.g. ATM cell format, IP packet format, etc.). The DSL AFE circuit 302 and the DSL DSP circuit 304 also jointly facilitate a digital-to-analog process for converting DSL signals transmitted upstream from the subscriber premise NID 300 from the transmission unit specific digital format to the DSL specific analog format.

A Processor/Transmission Unit Segmenting And Reassembly (processor/TU-SAR) circuit 306 is connected to the DSL DSP circuit 304. The processor/TU-SAR circuit 306 facilitates reassembly of downstream transmission unit contents and segmentation of upstream transmission units. Reassembling and segmenting content of a transmission unit is an example of reassembling and segmenting, respectively, upstream and downstream transmission units. Such reassembly may include removing overhead and/or headers from transmission units. Likewise, such segmentation may include adding necessary overhead and/or headers to transmission units. In an embodiment where voice is transmitted as data (i.e. voice content transmitted via a personal computer), data transmission units such as IP packets (i.e. a first data transport protocol) may be segmented into a plurality of corresponding ATM cells (a second data transport protocol).

In at least one embodiment of the processor/TU-SAR circuit 306, the processor/TU-SAR also facilitates assessment of a channel identifier of each downstream transmission unit and assignment of a channel identifier to each upstream transmission unit. Assessment of the channel identifier enables a type of content of each transmission unit to be identified. Accordingly, downstream transmission units identified as carrying voice signal content continue along a voice-specific downstream path within the subscriber premise NID 300 and downstream transmission units identified as carrying data and/or video content continue along a data-specific downstream path within the subscriber premise NID 300.

The voice-specific downstream path includes a voice signal DSP circuit 308 and an encode-decode (CODEC) circuit 310. The voice signal DSP circuit 308 is connected between the processor/TU-SAR circuit 306 and the CODEC circuit 310 and the CODEC circuit 310 is further connected directly to the processor/TU-SAR circuit 306. The voice signal DSP circuit 308 and the CODEC circuit 310 jointly facilitate converting downstream voice signal transmission units to one or more corresponding downstream analog voice signals and jointly facilitate converting one or more upstream analog voice signals to corresponding voice signal upstream transmission units.

A voice signal conversion module comprises the voice signal DSP circuit 308 and the CODEC circuit 310. In at least one embodiment of the voice signal conversion module, the voice signal conversion module transmission unit further facilitates assessing a port identifier of each one of the voice signal downstream transmission units and assigning a port identifier to each one of the voice signal upstream transmission units. In this manner, a corresponding port and thus, telephone number, can be associated with each one of the voice signal downstream and upstream transmission units.

A plurality of Subscriber Line Interface/Low Pass Filter (SLI/LFP) circuits 312 are connected to the CODEC circuit 310. Each one of the SLI/LPF circuits 312 is connected to a respective one of a plurality of subscriber interface ports 314. In the downstream direction, the SLI/LPF circuits facilitate delivering each one of the one or more downstream analog voice signals to the respective one of the plurality of subscriber interface ports 314. In the upstream direction, the SLI/LPF circuits 312 facilitate filtering a relatively high-frequency component from an aggregate upstream signal. The aggregate upstream signal is an example of a signal including a relatively low-frequency voice component and a relatively high-frequency data component. The aggregate upstream signal is received at one or more of the subscriber interface ports 314.

A Data Transmission/High Pass Filter (DT/HPF) circuit 316 is connected between the processor/TU-SAR circuit and each one of the subscriber interface ports 314. In the downstream direction, the DT/HPF circuit 316 facilitates transmitting the data downstream transmission units toward the subscriber premise via a desired transport protocol (e.g. Internet Protocol over Home Phone Networking Alliance methodology). Home Phone Networking Alliance methodology is an example of a subscriber premise specific transport mechanism. In the upstream direction, the DT/HPF circuit 316 facilitates filtering a relatively low-frequency component (e.g. an analog voice signal) from the aggregate upstream signal (i.e. the analog voice signal and a data upstream transmission unit signal) and transmitting the data upstream transmission units to the processor TU/SAR circuit 306.

The subscriber premise NID 300 includes diagnostic circuitry for enabling diagnostic test sequences to be facilitated on the subscriber premise NID 300 and on remote communication facilities (e.g. central office paired-conductor transmission lines and subscriber premise paired-conductors transmission lines) connected to the subscriber premise NID 300. A Mechanized Loop Test (MLT) termination circuit 318 is connected between the DSL AFE circuit 302 and a front-end port 320. The MLT termination circuit 318 facilitates MLT type test sequences to be performed on the paired-conductor transmission line 322 connected between a central office communication system and the subscriber premise NID 300 (i.e. a service provider paired conductor transmission line). A channel/premise wiring test circuit 324 is connected between the processor/TU-SAR circuit 306 and each one of the subscriber interface ports 314. The channel/premise wiring test circuit 324 is connected to each one of the subscriber interface ports 414. The channel/premise wiring test circuit 324 is connected to each one of the subscriber interface ports 314 via a test access circuit 326.

The channel/premise wiring circuit 324 and test access circuit 326 facilitate diagnostic test sequences to be performed on circuitry of the voice signal and on subscriber premise transmission facilities (e.g. a subscriber premise pair-conductor transmission line). For example, the channel/premise wiring circuit 324 facilitates normal channel testing to be done on the SLI circuits 312 (e.g. parametric and signaling tests), while a diagnostic test sequence (e.g. a test sequence according to GR-909 or TR-398) is performed on the subscriber premise (e.g. in-house) wiring. Results of the test sequence are sent back to the voice gateway, where failure/pass is transmitted to a central office test head via the resistive signatures defined in GR-909.

The subscriber premise NID 300 further includes a power detect and conversion circuit 328. The power detect and conversion circuit 328 receives an NID supply voltage supplied from a central office power supply via a service provider paired-conductor transmission line 330 connected between the central office power supply and the subscriber premise NID 300. A low pass filter circuit 332 is connected between the transmission line 330 and the power detect and conversion circuit 328 for preventing the loading down or attenuation of the DSL signal and for attenuating the high frequency energy that goes from power detect and conversion circuit 328 back into the DSL signal. The power detect and conversion circuit 328 supplies appropriate levels of power to the various circuits and circuit components of the subscriber premise NID 300. The power detect and conversion circuit 328 also automatically facilitates termination of the service provider paired-conductor transmission line 330 (e.g. via the MLT termination circuit 318) in response to the NID supply voltage being removed from the service provider paired-conductor transmission line 330, thus allowing a MLT type test sequence to be conducted on the service provider paired-conductor transmission line 330. It should be understood that such a test sequence cannot generally be conducted with the NID supply voltage on the service provider paired-conductor transmission line.

Figure 4:
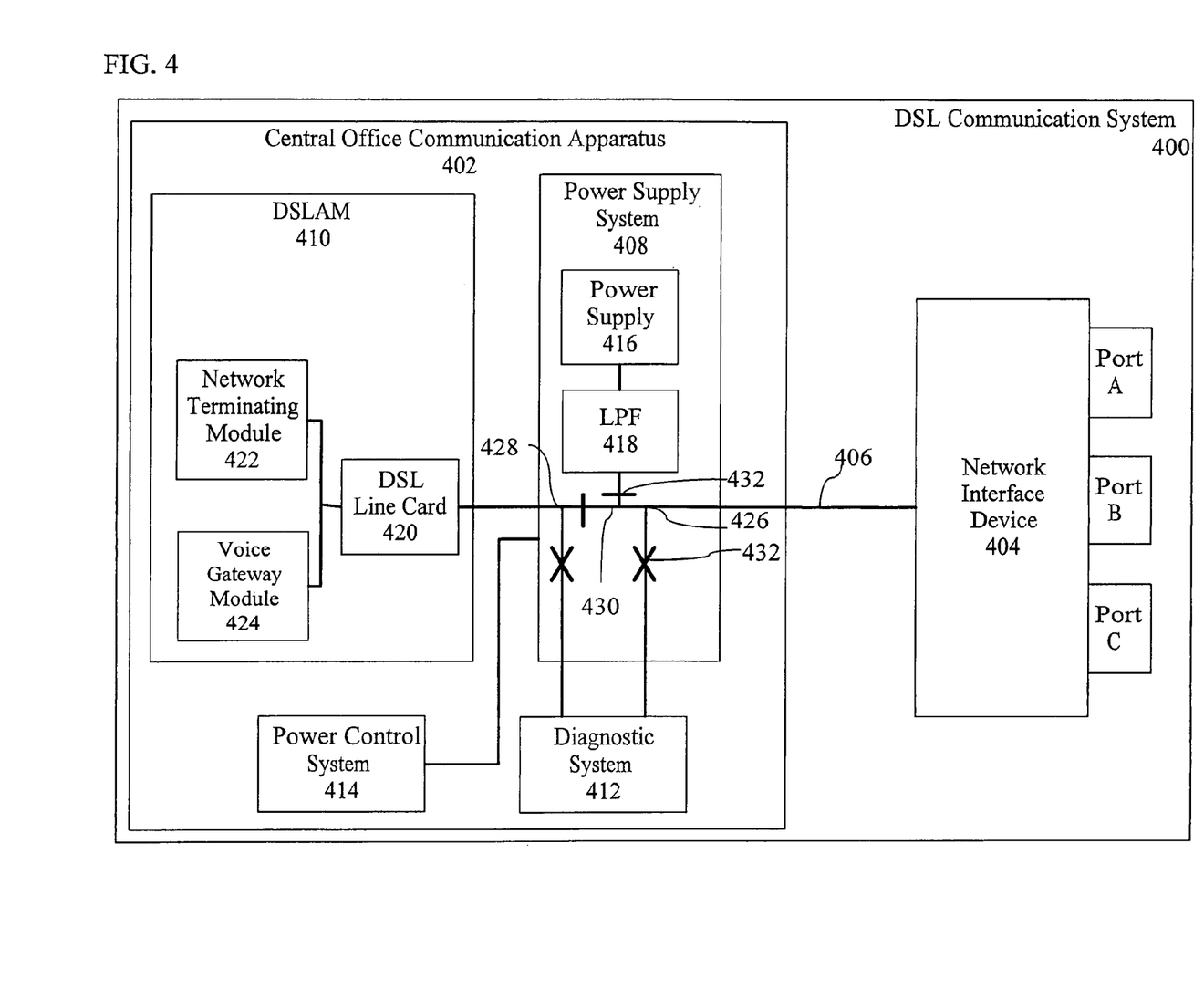
FIG. 4 is a block diagram depicting a DSL communication system in accordance with an embodiment of the disclosures made herein, wherein the DSL communication system is capable of facilitating methods disclosed herein.

A DSL communication system 400 in accordance with an embodiment of the disclosures made herein is depicted in FIG. 4. The DSL communication system 400 includes a central office communication apparatus 402 connected to a subscriber premise NID 404. The subscriber premise NID 404 is capable of providing functionality as disclosed herein. The DSL communication apparatus 402 is connected to the subscriber premise NID via a service provider paired-conductor transmission line 406. The central office communication apparatus 402 includes a power supply system 408, a Digital Subscriber Line Access Multiplexor (DSLAM) 410, a diagnostic system 412, and a power control system 414.

The power supply system 408 is connected between the DSLAM 410 and the subscriber premise NID 404. The power supply system 408 supplies an NID supply voltage to the subscriber premise NID 404 via the service provider paired-conductor transmission line 406. The power supply system 408 includes a power supply 416 serving as a source for the NID supply voltage. A low pass filter (LPF) 418 is connected between the power supply 416 and the transmission line 406 for preventing the loading down or attenuation of the DSL signal and for attenuating the high frequency energy that goes from power supply 416 into the DSL signal on the transmission line 406. It is contemplated herein that redundant power supplies may be provided for system robustness.

The power supply system 408 permits the subscriber premise NID 404 to be remotely powered from the CO (or remote housing), allowing subscriber premise NID functionality even if subscriber premise powering (i.e. utility company provided AC power) fails. This permits POTS services to still be "life-line", while also permitting battery powered laptops with a NID compatible interface (e.g. HPNA interface) to function as well.

Present technology implementation require the subscriber premise NID 404 to consume power at approximately an 8 watt level (assuming data service and 2 POTS lines off-hook and 1 line ringing). This means that the power delivered by the powering system to be approximately 16 watts (with half the power worst case lost in the loop). Accordingly, an NID supply voltage of about 190 volts +/−5% DC is required to provide service to CSA loops (e.g. 12 Kft 24 ga, 9 Kft 26 ga.).

When remote powering of the subscriber premise NID 404 is facilitated over the service provider paired conductor transmission line 406 and all POTS lines are derived, the traditional office battery feed/signaling path is replaced by the NID supply voltage from the NID power supply system 408. Accordingly, the conventional analog signaling needs to be facilitated in a non-conventional manner. One embodiment of such a non-conventional signaling scheme includes converting the DC signaling/ringing to an AAL2 ATM channel associated signaling stream at the Voice Gateway, transmitting this cell stream via a DSL protocol over the service provider paired conductor transmission line 406, and reconverting the AAL2 ATM stream to conventional POTS signaling/ringing at the NID 404.

The power supply system 408 includes relay circuitry for allowing the NID supply voltage to be removed during MLT type testing evaluations. Such relay circuitry also enables power to be removed from the subscriber premise NID 404 for disabling operability of the subscriber premise NID 404 when service is to be denied. The relay circuitry will also have an MTAU function on it to do wideband testing on a test-in/test-out/monitor basis, manipulated by a control card in the powering system shelf. If the MTAU function in the DSL line card is to be used instead of the MTAU function of the powering system, coordination with the power supply system 408 is still needed to remove the NID supply voltage during MLT type testing sequences of the service provider paired conductor transmission line 406.

The DSLAM 410 includes a DSL line card 420, a network termination module 422 and a voice gateway module 424. The network termination module 422 and the voice gateway module 424 are each coupled to the DSL line card 420 and respective upstream communication apparatuses (not shown). It is contemplated herein that the voice gateway module 424 may be external to the DSLAM at the central office location or remote location. It is contemplated herein that the DSLAM may be replaced by a Digital Loop Carrier (DLC) with DSL capabilities, or other functionally suitable apparatus. It is also contemplated herein that a high pass filter may be included in the power supply system 408 in order to prevent the power supply voltage from getting into the DSLAM or DLC. When this high pass filter is included, it connects between point 428 and the DSL line card 420.

The diagnostic system 412 is connected to the service provider paired-conductor transmission line 406 at a first point 426 and at a second point 428. The first point 426 is between a power insertion point 430 of the power supply 408 and the subscriber premise NID 404. The second point 428 is between the DSLAM 410 and the power insertion point 430. Accordingly, upstream and downstream (relative to the power supply system 408) diagnostic test sequences may be facilitated via the diagnostic system 412.

The power control system 414 is connected to the power supply system 408 and is capable of facilitating management of the power supply system 408. In conjunction with a plurality of relays 432 of the power supply system 408, the power control system 414 is capable of controlling various states of the NID supply voltage. Such various states include application, removal and magnitude adjustment of the NID supply voltage.

Functionality of the subscriber premise NID 404 is supported by gateway functionality provided by the voice gateway module 424. In at least one embodiment of the voice gateway module 424, the voice gateway module 424 supports IDLC Generic Requirements, Objectives and Interface (GR-303)/Digital Interface Between the SLC96 DLC System and a Local Digital Switch (GR-008). Embodiments of the voice gateway module 424 based on Voice Over Internet Protocol (VOIP) and Voice Over ATM are also contemplated herein. In GR-303/GR-008 based embodiments of the voice gateway module 424, the voice gateway module 424 facilitates translation of encoded voice bearing AAL2 cells into Pulse Code Modulation/Time Division Multiplexing (PCM/TDM) telephony interfaces (i.e. DS1, OC3) for a local digital switch. On instance of a VOIP embodiment of the voice gateway module 424 is the interworking between encoded voice in IP packets and encoded voice in AAL2 adapted ATM cells, and also the interworking between softswitch managed call control and channel associated call control and signaling.

As disclosed herein, subscriber premise NIDs in accordance with embodiments of the disclosures made herein are supported by central office/remote equipment that transmits a DSL signal to the subscriber premise NID. It is also disclosed herein that such NIDs also have a NID supply voltage supplied via a central office apparatus. Accordingly, loss of home power does not affect telephone use, thus providing "lifeline" service for telephony. The subscriber premise NID supply voltage is typically monitored and redundant.

In accordance with at least one embodiments of the disclosures made herein, all traffic over a paired conductor transmission line facility connected between the central office and the subscriber premise NID is ATM based. The subscriber premise NID separates and routes the ATM cells, as necessary. The ATM cells are separated and routed based on identifiers (e.g. VP/VC identity) carried by the traffic. ATM cell transport over DSL is desirable as it is the prevalent high-speed data delivery system to subscribers in many DSL markets. Voice services (encoded into ATM cells) are converted from ATM cell content to analog signals in the subscriber premise NID and presented to appropriate subscriber interface ports, such as via RJ11 connectors. In this manner, the subscriber premise NID supports multiple POTS lines over a single copper pair entering the subscriber premise NID. Data bandwidth not used for voice services can be used for data/video services. In the case of HPNA, this data is converted to HPNA format, and overlaid on the same lines as the POTS lines (using a different frequency spectrum).

As all traffic between the subscriber premise NID and the central office DSLAM is ATM data formatted (converted to voice where applicable), it must be capable of entering appropriate networks for routing/switching. This is done in several ways, depending on service provider/central office preference. Where all upstream traffic from the subscriber premise NID remains as ATM streams to be switched at an ATM switch, these ATM cell streams would exit a network termination (NT, i.e. DS3, OC3, etc.) in the central office (or remote housing) and home on an ATM switch, with voice ATM streams going to a Voice Gateway (i.e., ATM in GR303 or GR-008 formatted signals out to a Class 5 switch) and with data and/or video streams continuing through a designated data network. Alternatively, integrated gateway units can be provided within the DSLAM to connect voice services to a Class 5 switch (GR-008/GR303) or to a packet switch for VOIP applications.

NID and central office communication apparatus architecture in accordance with embodiments of the disclosures made herein provide a high degree of testability and diagnostics. Such an NID permits diagnostic evaluations of the service provider paired conductor transmission line(s), NID circuitry and subscriber premise wiring. However, because POTS lines are all derived from digital transmission units (e.g. ATM cells), service provider paired-conductor transmission lines are simply a transport facility capable of transmitting upstream and downstream transmission units. Accordingly, diagnostic evaluations must be implemented in a suitable and compatible manner.

Figure 5:
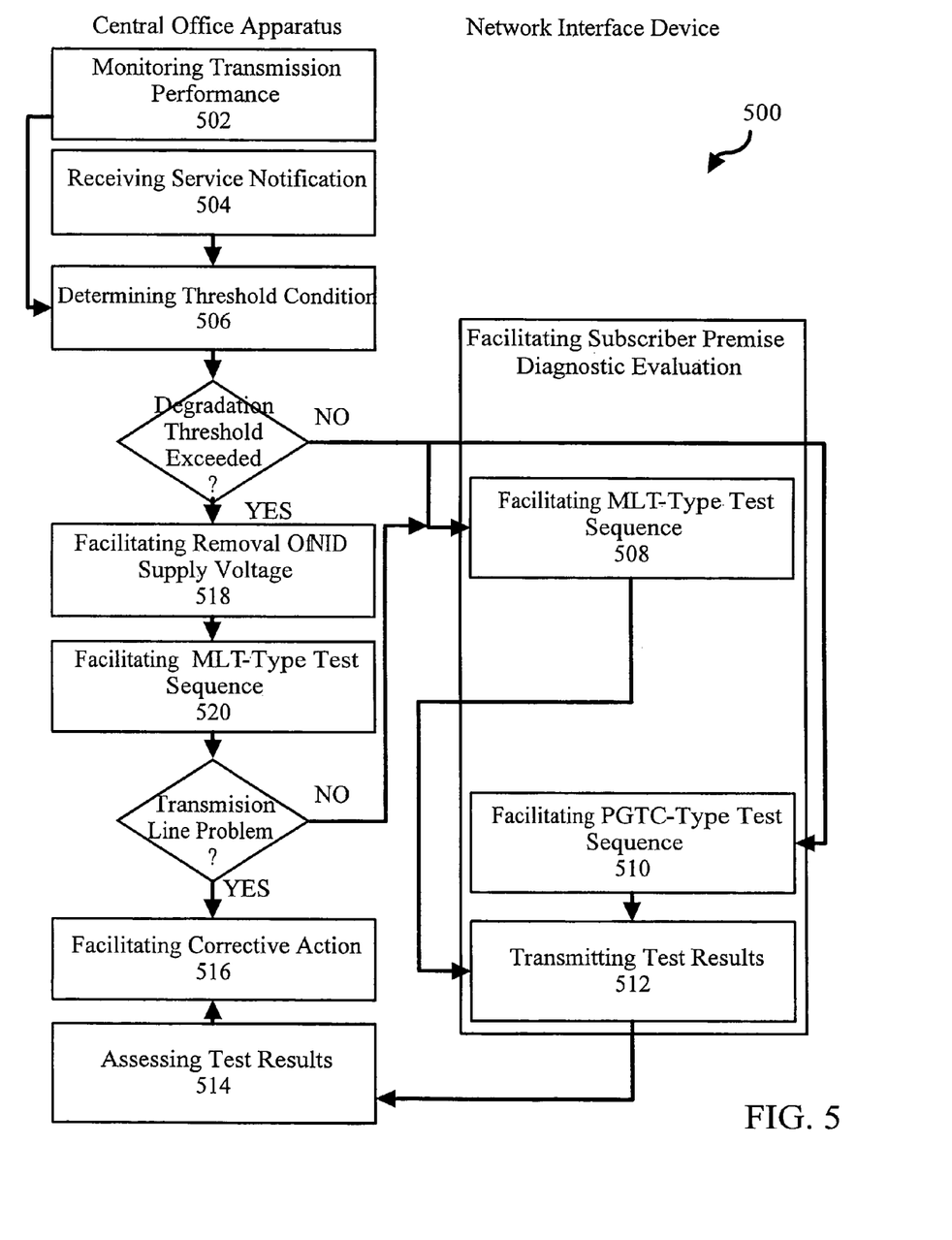
FIG. 5 is a flow chart view depicting a method 500 for facilitating diagnostic evaluation in accordance with an embodiment of the disclosures made herein, wherein the method is capable of facilitating diagnostic evaluation of a service subscriber paired-conductor transmission line, subscriber premise NID circuitry and a subscriber premise transmission facility (i.e. in-house paired-conductor transmission line).

FIG. 5 depicts an embodiment of a method 500 for facilitating diagnostic evaluation of a service subscriber paired-conductor transmission line, subscriber premise NID circuitry and subscriber premise transmission facility (i.e. in-house paired-conductor transmission line). In response to performing an operation 502 for monitoring transmission performance of the service provider paired conductor transmission line at a central office communication apparatus and/or in response to performing an operation 504 for receiving a service notification at the central office communication apparatus, an operation 506 is performed at the central office communication apparatus for determining whether a degradation threshold has been exceeded. It should be noted that continual or periodic monitoring of transmission performance of the service provider paired-conductor transmission line allows any adverse transmission performance to be identified in a timely manner. Accordingly, there is a high likeliness that any degradation in transmission performance would be identified before a service notification related to such degradation would be issued.

In response to determining that the degradation threshold has not been exceeded on the facility pair running from the CO to the NID, a subscriber premise facility diagnostic evaluation is performed. At least a portion of the subscriber premise facility diagnostic evaluation is implemented by the subscriber premise NID. The subscriber premise diagnostic evaluation includes an operation 508 for performing a MLT type test sequence (i.e. a first type of diagnostic evaluation) for evaluating performance of subscriber premise transmission lines (i.e. the subscriber in-premise wiring facilities) and an operation 510 for facilitating channel testing in response to a Paired Gain Test Controller (PGTC) type test sequence (i.e. a second type of diagnostic evaluation) for evaluating the circuitry function of the entire connection between the local switch and the subscriber premise NID. Examples of MLT type tests include tests for evaluating foreign emf (FEMF), resistive/capacitive faults, receiver off-hook (ROH) and ringer test. Examples of PGTC type tests are tests in which the PGTC applies voltages/ringing and, in response, expects terminations/ring trips to be applied at the far end (i.e. subscriber premise NID) so that transmission and signaling tests can be performed. One embodiment of facilitating the PGTC type test sequence includes responding to voltages and/or signals (i.e. test conditions) governed by a PGTC test apparatus so that circuit performance measurements may be made by the PGTC test apparatus. In this manner, the subscriber premise NID enables a PGTC type test sequence to be performed. It is contemplated herein that a subset of an MLT type test sequence may be performed for evaluating performance of subscriber premise transmission lines, such as a subset disclosed in GR-909.

After performing the MLT type test sequence and performing the PGTC type test sequence, an operation 512 is performed for transmitting appropriate test results from the subscriber premise NID for reception by the central office communication apparatus and an operation 514 is performed at the central office communication apparatus for assessing the test results. One embodiment of transmitting appropriate test results includes transmitting messages that convey the appropriate test results corresponding to the MLT test result to a voice gateway. The voice gateway, in turn, communicates the test results to a MLT test head via resistive assignment, thus enabling the central office MLT tester to assess the test results. After assessing the test results, an operation 516 is performed for facilitating an appropriate corrective action to be implemented. After such corrective action has been successfully implemented, the method 500 continues at the operation 502 for monitoring transmission line performance.

Returning to the operation 506 for determining whether the degradation threshold has been exceeded, in response to determining that the degradation threshold has been exceeded, an operation 518 is performed for facilitating removal of the NID supply voltage from the service provider paired-conductor transmission line. That is, providing the NID supply voltage is provided via the service provider paired-conductor transmission line. After removal of the NID supply voltage, an operation 520 is performed for facilitating a MLT type test sequence on the service provider paired-conductor transmission line (i.e. on a copper facility from a CO/Remote apparatus to the NID). It is contemplated herein that the NID supply voltage may be provided via a subscriber premise supply system in an alternate embodiment. In such an embodiment, the operation 508 for facilitating removal of the NID supply voltage is unnecessary.

In response to the MLT type test sequence identifying a problem with the service provider paired conductor transmission line, the operation 516 is performed for facilitating the appropriate corrective action. After such corrective action has been successfully implemented, the method continues at the operation 502 for monitoring transmission line performance. In response to the MLT type test sequence not identifying a problem with the service provider paired conductor transmission line, the subscriber premise facility diagnostic evaluation is facilitated, as discussed above.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. Also, while embodiments disclosed herein relate to cell-based DSL solutions, it is contemplated that embodiments of the disclosures made herein may be implemented via frame-based DSL solutions. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for communicating voice signals, comprising:
facilitating a downstream DSL voice channel transmission process at a subscriber premise Network Interface Device (NID), wherein the downstream DSL voice channel transmission process facilitates convening a voice component of a downstream DSL data stream to a corresponding downstream analog voice signal, wherein converting the voice component includes assessing a channel identifier of each downstream transmission unit of the voice component of the downstream DSL data stream and correlating the channel identifier to a particular type of content carried within each downstream transmission unit; and
facilitating an upstream DSL voice channel transmission process at the subscriber premise NID, wherein the upstream DSL voice channel transmission process facilitates converting an upstream analog voice signal to an upstream voice component of an upstream DSL data stream and processing voice signal upstream transmission units of the upstream analog voice signal, wherein said processing of the voice upstream transmission units includes segmenting contents of said voice signal upstream transmission units and assigning a channel identifier to each one of said segmented voice signal upstream transmission units, wherein the channel identifier of each one of said segments designates a particular type of content carried within each one of said segments.

2. The method of claim 1 wherein facilitating the downstream voice channel transmission process includes receiving the downstream DSL data stream; identifying voice signal downstream transmission units of the downstream DSL data stream using the channel identifier of each downstream transmission unit; and converting said voice signal downstream transmission units to the corresponding downstream analog voice signal dependent upon the channel identifier of each downstream transmission unit.

3. The method of claim 2 wherein identifying said voice signal downstream transmission units includes determining a transmission layer protocol associated with each one of said voice signal downstream transmission units.

4. The method of claim 2 wherein converting said voice signal downstream transmission units to the corresponding downstream analog voice signal includes performing a transmission unit-to-analog conversion operation for converting contents of said voice signal downstream transmission units to the corresponding downstream analog voice signal.

5. The method of claim 4 wherein each one of said voice signal downstream transmission units is received by the subscriber premise NID as an Asynchronous Transfer Mode (ATM) cell.

6. A method for facilitating transmission of Digital Subscriber Line (DSL) information at a subscriber premise Network Interface Device (NID), comprising:
receiving a downstream DSL data stream including a plurality of downstream transmission units;
assessing each one of said downstream transmission units for identifying voice signal downstream transmission units and data downstream transmission units; and
converting each one of said voice signal downstream transmission units to a corresponding downstream analog voice signal, wherein converting each one of said voice signal downstream transmission units includes assessing a channel identifier of each one of said voice signal downstream transmission units and correlating the channel identifier to a particular type of content carried within each one of said voice signal downstream transmission units.

7. The method of claim 6 wherein each one of said downstream transmission units is an Asynchronous Transfer Mode (ATM) cell.

8. The method of claim 6 wherein each one of said downstream transmission units is an Internet Protocol (IP) packet.

9. The method of claim 6 wherein assessing each one of said downstream transmission units includes determining a transmission layer protocol associated with each one of said downstream transmission units.

10. The method of claim 6 wherein converting said voice signal downstream transmission units includes performing a transmission unit-to-analog conversion operation for said voice signal downstream transmission units to respective portions of the corresponding downstream analog voice signal.

11. A method for facilitating transmission of Digital Subscriber Line (DSL) information at a subscriber premise Network Interface Device (NID), comprising:
receiving an upstream analog voice signal at a designated subscriber interface port of the subscriber premise NID;
performing an upstream voice channel transmission process for generating a plurality of voice signal upstream transmission units corresponding to the upstream analog voice signal; and
processing said voice signal upstream transmission units for enabling contents of said voice signal upstream transmission units to be transmitted via a DSL data transport protocol toward a central office communication apparatus, wherein processing said voice signal upstream transmission units includes segmenting contents of said voice signal upstream transmission units and assigning a channel identifier to each one of said segmented voice signal upstream transmission units, wherein the channel identifier of each one of said segments designates a particular type of content carried therein.

12. The method of claim 11 wherein each one of said voice signal upstream transmission units is an Internet Protocol packet.

13. The method of claim 11 wherein each one of said voice signal upstream transmission units is an Asynchronous Transfer Mode cell.

14. The method of claim 11 wherein receiving the upstream analog voice signal includes filtering an aggregate upstream signal for removing a first frequency component of the aggregate upstream signal.

15. The method of claim 14 wherein the first frequency component includes a frequency component associated with a data component of the aggregate upstream signal.

16. The method of claim 11 wherein performing the upstream voice channel transmission process includes performing an analog-to-transmission unit conversion operation for converting the analog voice signal to said contents of said voice signal upstream transmission units.

\* \* \* \* \*

UNITED STATES PATENT AND TRADEMARK OFFICE
CERTIFICATE OF CORRECTION

PATENT NO. : 7,639,697 B2  Page 1 of 1
APPLICATION NO. : 11/354525
DATED : December 29, 2009
INVENTOR(S) : Czerwiec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Twenty-first Day of December, 2010

David J. Kappos
*Director of the United States Patent and Trademark Office*